Oct. 13, 1964    R. WEMMER    3,152,357
ANIMAL ELECTRICAL STUNNING APPARATUS
Filed Sept. 2, 1960
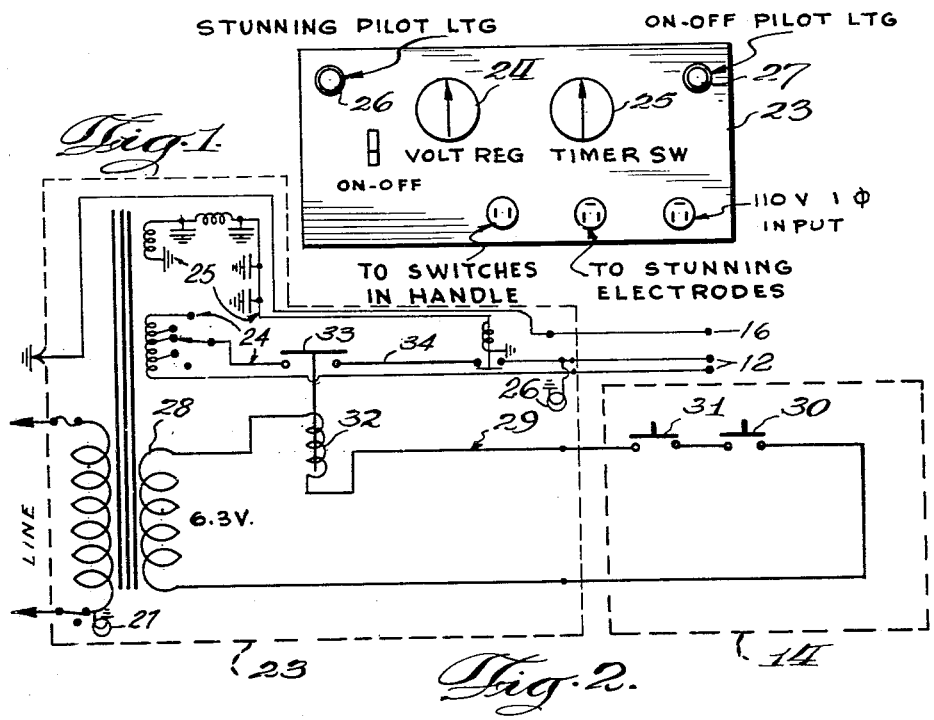
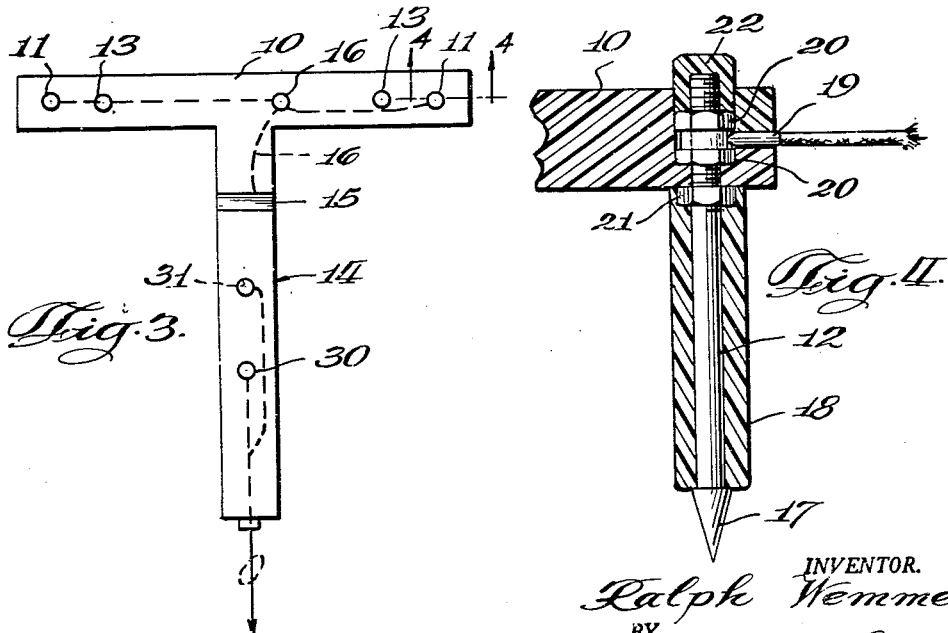
INVENTOR.
Ralph Wemmer
BY
Carl C Batz
Attorney 3,152,357
ANIMAL ELECTRICAL STUNNING APPARATUS
Ralph Wemmer, Omaha, Nebr., assignor, by mesne assignments, to Armour and Company, Chicago, Ill., a corporation of Delaware
Filed Sept. 2, 1960, Ser. No. 53,705
5 Claims. (Cl. 17—1)

This invention relates to animal electrical stunning apparatus, and is particularly useful in the safe and humane slaughter of meat animals, such as hogs, cattle, sheep, and other animals.

An object of the invention is to provide apparatus for stunning nimals to immobilize them preparatory to slaughter, while at the same time insuring the safety of the operator. A further object is to provide electrical stunning apparatus which makes for accuracy in applying electric current to the selected portions of the animal while it is in motion. A further object is to provide time and voltage regulating means for controlling the current flow through a period which will effectively stun but not kill the animal. Other specific objects and advantages will appear as the specification proceeds.

The invention is shown in an illustrative embodiment by the accompanying drawing, in which—

FIG. 1 is a front view in elevation of a control unit which may be employed; FIG. 2, a wiring diagram showing the low voltage circuit including handle switches and the associated high voltage circuit to the stunning electrodes; FIG. 3, a plan view of the stunning applicator; and FIG. 4, a sectional detail view taken along line 4—4 of FIG. 3 on an enlarged scale of the electrode employed.

In the illustration given in FIGS. 3 and 4, 10 designates a crossbar or electrode-supporting bar having at its outer ends recesses 11 for receiving the electrode 12. Spaced inwardly from the recesses 11 are recesses 13 which may also receive electrodes when a narrow spacing of the electrodes is desired. It will be understood that the bar 10 may have any number of recesses for receiving electrodes so that they may be adjusted to the desired spacing for the animals which are to be stunned.

Extending laterally and at right angles to the bar 10 is the handle 14. The bar 10 and the handle 14 are preferably made of insulating material, such as, for example, maplewood, or any other material which will not only be insulating in character but which will tend to prevent the collection of moisture on its surface. In the handle near the point where it joins the bar 10, I provide a grounding separator steel bar 15, the purpose of which is to provide a ground so that any surface leakage of current from bar 10 will be received by the ground 15, and it is preferably conducted therefrom by a cable 16 leading back to a ground in the control unit.

The electrode 12 is preferably provided with a sharp steel point 17 and is enclosed with an insulating sleeve 18. The high voltage wire 19 connects with threaded portions of the electrode 12, as shown best in FIG. 4, and the wire sleeve terminal is confined against the electrode by the nuts 20. A further nut 21 is provided below the bar 10, and an insulating nut 22 is provided over the threaded upper end of the electrode 12.

A control unit 23, as shown best in FIG. 1, may be supported adjacent the area where the stunning applicator is to be used. Housed within the unit is a voltage regulator 24 for producing the desired voltage in the stunning operation. Also, a timing switch 25 is provided which automatically limits the period in which the current is being applied. The unit is provided also with a stunning pilot light 26 indicating to the operator that the stunning current is being applied, and a similar indicator light 27 is provided for indicating the position of the on-off switch. Electrical connections are provided, as indicated in FIG. 2, to the switches in the handle and to the stunning electrode and to the main power line.

In order to limit the danger of injury to the operator, I provide a light voltage circuit, as illustrated in FIG. 2. A transformer 28 in the control unit 23 reduces the voltage for the handle circuit 14 so that the handle 14 carried by the operator carries a very voltage, such as, for example, 6.3 volts. Two switches 30 and 31 are provided in the handle, and it is necessary for the operator to close both of the switches before the current 29 is applied. The low current of circuit 29 activates a relay coil 32 which, in turn, closes the switch 33 of the high voltage stunning circuit 34.

In the operation of the apparatus, the operator holds the handle portion 14 rearwardly of the steel plate 15, and as the animal approaches the crossarm 10 is brought into engagement with the animal so that one electrode 12 engages the forehead of the animal and the other electrode preferably engages the backbone or saddle of the animal. For example, in applying the current to a hog for stunning the hog prior to slaughter, the bar 10 is brought downwardly so that one electrode engages the forehead of the hog, and then by rotating the handle slightly the other electrode falls into line with the saddle of the hog to complete the circuit and cause the current flow along the spinal column of the hog when the two switches 30 and 31 are closed by the operator. In this operation, the handle and crossbar arrangement is particularly effective where the animal is moving because the operator can, after locating one electrode against the forehead, simply rotate the handle, and because the other electrode is in longitudinal alignment with the first electrode the second electrode will engage the spinal column of the hog.

The structure provides great safety for the operator. Since the switch circuit carried by the handle is a low voltage circuit, the operator would not be harmed even if there were a slight leakage of current. The low voltage circuit 29 actuates the relay coil 32 which closes a switch 33 to activate the high voltage circuit 34 in which the electrodes 12 are placed. Should there be any surface leakage from the crossbar 10 by reason of moisture collecting thereon, the steel bar 15 provides a ground for such leakage so that the current flow does not reach the handle portion held by the operator.

The timer control 25, as diagrammatically illustrated in FIG. 2, prevents the killing of the animal by electrocution so that when the operator has applied the electrodes and closed the switches 30 and 31, the stunning current is closed off automatically after the lapse of a predetermined time.

While in the foregoing specification, I have set forth in considerable detail an embodiment of the invention, it will be understood that such details of structure and procedure may be varied widely by those skilled in the art without departing from the spirit of my invention.

I claim:
1. A stunning device for immobilizing animals, comprising an insulating crossbar, electrodes carried by terminal portions of said crossbar, an insulating handle extending laterally from said crossbar, switches in said handle, a low voltage circuit including said switches and a relay coil which is activated by said low voltage circuit upon the closing of said switches, and a high voltage circuit connected to said electrodes and including a relay switch whereupon activation of said relay coil by said low voltage circuit closes said relay switch thereby furnishing high voltage to said electrodes, said electrodes being spaced for engagement with the forehead and saddle of an animal to complete said high voltage circuit.

2. The structure of claim 1 in which said crossbar is provided with a plurality of recesses along its length to provide varied spacing of said electrodes.

3. The structure of claim 1 in which a ground is provided in the handle near the crossbar to electrically insulate the handle from the crossbar.

4. The structure of claim 1 in which the high voltage circuit includes a timer switch for breaking said high voltage circuit after the lapse of a predetermined period of time.

5. A stunning device for immobilizing animals comprising an insulating crossbar, electrodes carried by terminal portions of said crossbar, an insulating handle extending from said crossbar and including a handle switch, a high voltage circuit connected to said electrodes and including a switch, a low voltage circuit including said handle switch and means for closing said switch in high voltage circuit whereupon activation of said means by said low voltage circuit closes said high voltage switch thereby furnishing high voltage to said electrodes.

References Cited in the file of this patent

UNITED STATES PATENTS

| | | |
|---|---|---|
| 2,441,499 | Medlin | May 11, 1948 |
| 2,977,627 | Morse et al. | Apr. 4, 1961 |
| 3,055,046 | Hlavacek et al. | Sept. 25, 1962 |

FOREIGN PATENTS

| | | |
|---|---|---|
| 498,715 | Germany | May 31, 1930 |
| 364,386 | Great Britain | Jan. 7, 1932 |
| 437,740 | Great Britain | Nov. 1, 1935 |
| 154,157 | Switzerland | July 1, 1932 |